United States Patent
Fukushima et al.

(10) Patent No.: US 9,685,858 B2
(45) Date of Patent: Jun. 20, 2017

(54) DC/DC CONVERTER, CONTROL CIRCUIT AND CONTROL METHOD THEREOF, AND ELECTRONIC APPARATUS

(71) Applicant: ROHM CO., LTD., Ukyo-ku, Kyoto (JP)

(72) Inventors: Shun Fukushima, Kyoto (JP); Osamu Yanagida, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 64 days.

(21) Appl. No.: 14/704,234

(22) Filed: May 5, 2015

(65) Prior Publication Data

US 2015/0326123 A1 Nov. 12, 2015

(30) Foreign Application Priority Data

May 7, 2014 (JP) ................................ 2014-096315

(51) Int. Cl.
*H02M 3/156* (2006.01)
*H02M 3/158* (2006.01)
*H02M 1/00* (2006.01)

(52) U.S. Cl.
CPC .......... *H02M 3/156* (2013.01); *H02M 3/158* (2013.01); *H02M 2001/0009* (2013.01); *H02M 2001/0032* (2013.01); *Y02B 70/16* (2013.01)

(58) Field of Classification Search
CPC ....................................... H02M 3/155–3/1588
See application file for complete search history.

(56) References Cited

U.S. PATENT DOCUMENTS

| | | | | |
|---|---|---|---|---|
| 7,498,791 B2* | 3/2009 | Chen | ....................... | H02M 1/38 323/224 |
| 8,106,634 B2* | 1/2012 | Hojo | ..................... | H02M 3/156 323/222 |
| 2006/0208717 A1* | 9/2006 | Shimizu | ................ | H02M 3/157 323/284 |
| 2008/0036443 A1* | 2/2008 | Kojima | ............... | H02M 3/1588 323/351 |
| 2008/0136383 A1* | 6/2008 | Hasegawa | ........... | H02M 3/1588 323/271 |
| 2008/0174286 A1* | 7/2008 | Chu | .................... | H02M 3/1588 323/271 |

(Continued)

FOREIGN PATENT DOCUMENTS

JP 2005304295 A 10/2005

*Primary Examiner* — Matthew Nguyen
*Assistant Examiner* — Yusef Ahmed
(74) *Attorney, Agent, or Firm* — Cantor Colburn LLP

(57) ABSTRACT

A control circuit of a DC/DC converter is disclosed. The control circuit includes a pulse modulator generating a comparison pulse, which is transitioned to an on level when a feedback voltage depending on an output voltage of the converter is lowered to a threshold voltage and then transitioned to an off level; a peak current detector asserting a detection signal when a coil current of the converter reaches a predetermined peak current; a logic part generating a control pulse which is transitioned to an on level when the comparison pulse is transitioned to the on level, and is transitioned to an off level at a time which is later among the time when the comparison pulse is transitioned to the off level and the time when the peak current detection signal is asserted; and a driver switching a switching transistor of the converter based on the control pulse.

23 Claims, 14 Drawing Sheets

(56) References Cited

U.S. PATENT DOCUMENTS

| | | | |
|---|---|---|---|
| 2008/0303492 A1* | 12/2008 | Aiura | H02M 1/44 323/270 |
| 2009/0146631 A1* | 6/2009 | Fukumori | H02M 3/1588 323/284 |
| 2009/0322299 A1* | 12/2009 | Michishita | H02M 3/156 323/282 |
| 2009/0322303 A1* | 12/2009 | Hirata | H02M 3/156 323/284 |
| 2010/0066328 A1* | 3/2010 | Shimizu | H02M 3/1588 323/282 |
| 2010/0156366 A1* | 6/2010 | Sakai | H02M 3/1588 323/282 |
| 2010/0253309 A1* | 10/2010 | Xi | H02M 3/156 323/288 |
| 2011/0089925 A1* | 4/2011 | Ishida | H02M 1/32 323/285 |
| 2011/0241641 A1* | 10/2011 | Chen | H02M 3/1588 323/284 |
| 2012/0038341 A1* | 2/2012 | Michishita | H02M 3/158 323/284 |
| 2012/0105031 A1* | 5/2012 | Kumagai | H02M 3/156 323/271 |
| 2012/0212195 A1* | 8/2012 | Kushida | H02M 3/1588 323/271 |
| 2013/0033905 A1* | 2/2013 | Lin | H02M 3/33507 363/21.13 |
| 2013/0038300 A1* | 2/2013 | Yanagida | H02M 3/1563 323/271 |
| 2013/0063108 A1* | 3/2013 | Nishida | H02M 3/156 323/271 |
| 2014/0070780 A1* | 3/2014 | Yanagida | H02M 3/1588 323/271 |
| 2015/0069986 A1* | 3/2015 | Yanagida | H02M 3/1582 323/271 |
| 2015/0229212 A1* | 8/2015 | Shiwaya | H02M 3/158 323/282 |
| 2016/0006340 A1* | 1/2016 | Xu | H02M 3/156 323/271 |

* cited by examiner

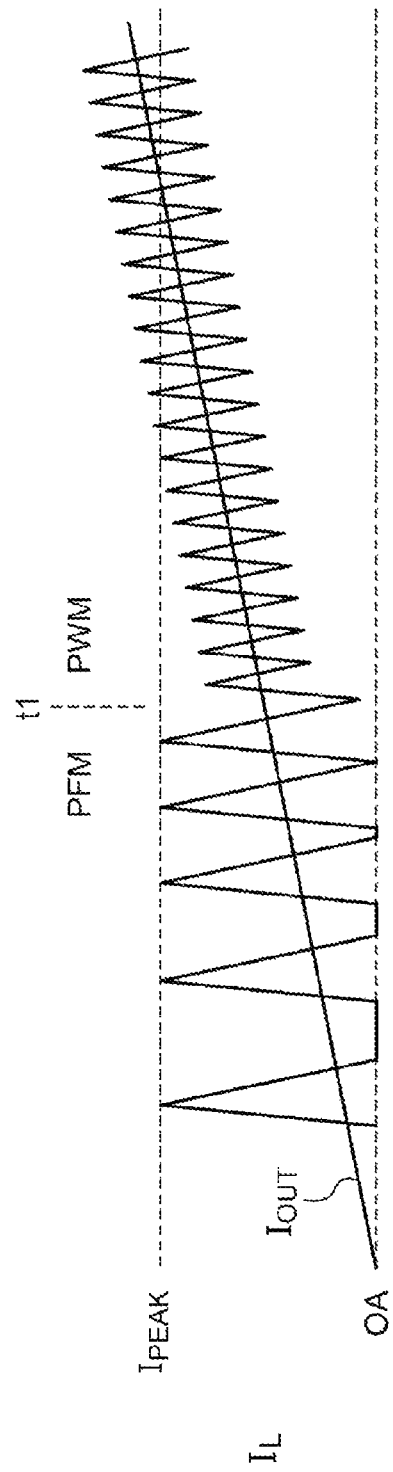

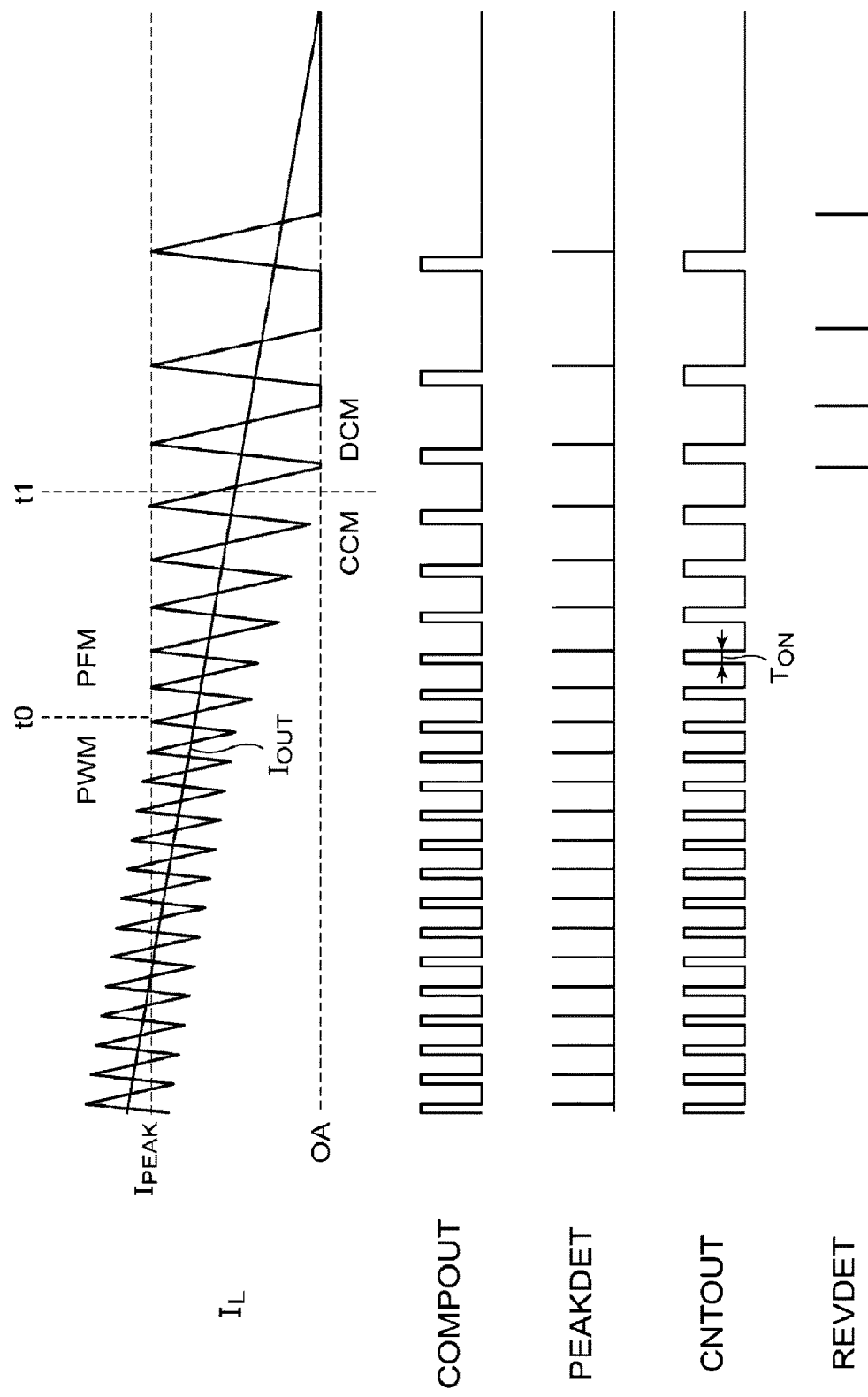

DC/DC CONVERTER, CONTROL CIRCUIT AND CONTROL METHOD THEREOF, AND ELECTRONIC APPARATUS

CROSS-REFERENCE TO RELATED APPLICATION

The present invention claims priority under 35 U.S.C. §119 to Japanese Application No. 2014-096315, filed on May 7, 2014, the entire content of which is incorporated herein by reference.

TECHNICAL FIELD

The present disclosure relates to a DC/DC converter (switching regulator).

BACKGROUND

In recent years, electronic apparatuses such as mobile phones, tablet PCs (Personal Computers) and so on have been equipped with a liquid crystal driver requiring a power supply voltage higher than a battery voltage and various processors requiring a power supply voltage lower than the battery voltage. A DC/DC converter is used to supply an appropriate power supply voltage to such devices.

A hysteresis control system has been known as a control system for DC/DC converters. The hysteresis control system has excellent load responsiveness over a voltage mode or current mode control system using an error amplifier.

FIGS. 1A and 1B are circuit diagrams showing a step-down DC/DC converter employing a hysteresis control system.

A step-down DC/DC converter 900a shown in FIG. 1A includes an output circuit 901, a driver 904 and a pulse modulator 906. The step-down DC/DC converter 900a stabilizes an input voltage $V_{IN}$ of an input line 902 to a predetermined voltage level which is then supplied to a load (not shown) connected to an output line 903. The output circuit 901 includes a switching transistor M1, a synchronous rectification transistor M2, an inductor L1 and an output capacitor C1. The output capacitor C1 includes an equivalent series resistance ESR.

The pulse modulator 906 generates a pulse signal S1 with a duty cycle adjusted such that an output voltage $V_{OUT}$ approaches a predetermined target level. The pulse modulator 906 includes resistors R1 and R2, a capacitor C2 and a hysteresis comparator 910.

The resistors R1 and R2 divide the output voltage $V_{OUT}$. The divided output voltage $V_{OUT}$ is also called a feedback voltage $V_{OUT}'$. The hysteresis comparator 910 compares the feedback voltage $V_{OUT}'$ with a threshold voltage $V_{TH}$ and generates the pulse signal S1 indicating a result of the comparison. The threshold voltage $V_{TH}$ transitions between two voltage levels $V_H$ and $V_L$ depending on the comparison result. The pulse signal S1 has a high level when $V_H > V_{OUT}'$ and has a low level when $V_H < V_{OUT}'$.

The driver 904 turns on the switching transistor M1 and turns off the synchronous rectification transistor M2 when the pulse signal S1 has the high level and turns off the switching transistor M1 and turns on the synchronous rectification transistor M2 when the pulse signal S1 has the low level.

FIG. 2 is an operation waveform diagram of the step-down DC/DC converter 900a shown in FIG. 1A. At time t1, the pulse signal S1 transitions to the high level. At this time, the threshold voltage $V_{TH}$ transitions to the upper level $V_H$.

In the period during which the pulse signal S1 has the high level, a coil current $I_L$ increases and a voltage drop of the ESR increases as well. As a result, the output voltage $V_{OUT}$ rises and the feedback voltage $V_{OUT}'$ rises as well. At time t2, when the feedback voltage $V_{OUT}'$ reaches the upper level $V_H$, the threshold voltage $V_{TH}$ transitions to the lower level $V_L$ and the output S1 of the hysteresis comparator 910 transitions to a low level.

In the period during which the pulse signal S1 has the low level, the coil current $I_L$ decreases with time and the voltage drop of the ESR decreases as well. As a result, the output voltage $V_{OUT}$ falls and the feedback voltage $V_{OUT}'$ falls as well. At time t2, when the feedback voltage $V_{OUT}'$ falls to the lower level $V_L$, the threshold voltage $V_{TH}$ transitions to the upper level $V_H$ again and the output S1 of the hysteresis comparator 910 transitions to a high level.

The step-down DC/DC converter 900a repeats this operation. As a result, the feedback voltage $V_{OUT}'$ is stabilized between $V_H$ and $V_L$ and the output voltage $V_{OUT}$ is stabilized between $V_H \times (R1+R2)/R2$ and $V_L \times (R1+R2)/R2$.

In the step-down DC/DC converter 900a shown in FIG. 1A, the voltage drop of the ESR of the output capacitor C1 is used as a ripple of the feedback voltage $V_{OUT}'$. In this case, however, there are problems in that a switching frequency is affected by variations of the ESR and that the power loss due to the ESR cannot be ignored.

A step-down DC/DC converter of a ripple injection type has been proposed to overcome the problems of the step-down DC/DC converter 900a shown in FIG. 1A. FIG. 1B shows a step-down DC/DC converter 900b employing a ripple injection type hysteresis control system.

The step-down DC/DC converter 900b shown in FIG. 1B includes a ripple injection circuit 912 in addition to the step-down DC/DC converter 900a shown in FIG. 1A.

The ripple injection circuit 912 receives the output signal S1 of the hysteresis comparator 910 or a correlated pulse signal and superimposes a ripple on an input side of the hysteresis comparator 910. Specifically, the ripple injection circuit 912 superimposes a voltage sloped in the positive direction with respect to the feedback voltage $V_{OUT}'$ in the period during which the output S1 of the hysteresis comparator 910 has the high level, that is, the period during which the switching transistor M1 is turned on and the synchronous rectification transistor M2 is turned off, and superimposes a voltage sloped in the negative direction with respect to the feedback voltage $V_{OUT}'$ in the period during which the output S1 of the hysteresis comparator 910 has a low level, that is, the period during which the switching transistor M1 is turned off and the synchronous rectification transistor M2 is turned on. Thus, without using the ripple due to the ESR, a ripple is superimposed on the feedback voltage $V_{OUT}'$.

An operation of the step-down DC/DC converter 900b shown in FIG. 1B will now be described with reference to FIG. 2. At time t1, the pulse signal S1 transitions to the high level. At this time, the threshold voltage $V_{TH}$ transitions to the upper level $V_H$.

In the period during which the pulse signal S1 has the high level, a positive-sloped voltage is superimposed on the feedback voltage $V_{OUT}'$ by the ripple injection circuit 912 and the feedback voltage $V_{OUT}'$ increases with time. At time t2, when the feedback voltage $V_{OUT}'$ reaches the upper level $V_H$, the threshold voltage $V_{TH}$ transitions to the lower level $V_L$ and the output S1 of the hysteresis comparator 910 transitions to a low level.

In the period during which the pulse signal S1 has a low level, a negative-sloped voltage is superimposed on the feedback voltage $V_{OUT}'$ by the ripple injection circuit 912 and the feedback voltage $V_{OUT}'$ decreases with time. At time t3, when the feedback voltage $V_{OUT}'$ falls to the lower level $V_L$, the threshold voltage $V_{TH}$ transitions to the upper level $V_H$ again and the output S1 of the hysteresis comparator 910 transitions to a high level.

The step-down DC/DC converter 900b repeats this operation. As a result, the feedback voltage $V_{OUT}'$ is stabilized between $V_H$ and $V_L$ and the output voltage $V_{OUT}$ is stabilized between $V_H \times (R1+R2)/R2$ and $V_L \times (R1+R2)/R2$.

Although the switching frequency of the DC/DC converter is not necessarily constant, the operation mode shown in FIG. 2 is referred to as a PWM mode.

In order to increase efficiency at a light load state of the DC/DC converter, the DC/DC converter may be operated in a mode (referred to as a PFM mode) different from the PWM mode. In the PFM mode, the switching transistor is turned off when the coil current $I_L$ reaches a predetermined peak current $I_{PEAK}$, and the switching transistor is turned on when the output voltage $V_{OUT}$ decreases to a target voltage. In this mode, the switching frequency is dynamically varied depending on a load current. As the load current decreases, the switching frequency is lowered to reduce a switching loss.

FIGS. 3A and 3B are waveform diagrams of a coil current $I_L$ in switching from a PWM mode to a PFM mode and switching from the PFM mode to the PWM mode, respectively.

An average of the coil current $I_L$ corresponds to the load current $I_{OUT}$. In FIG. 3A, an initial state is a PWM mode. As the load current $I_{OUT}$ decreases, the coil current $I_L$ becomes smaller and eventually turns negative. The step-down DC/DC converter 900 transitions to a PFM mode when a state in which the coil current $I_L$ becomes negative continues over a predetermined number (N) of cycles (time t0).

In FIG. 3B, an initial state is a PFM mode. As the load current $I_{OUT}$ increases, the coil current $I_L$ increases as well. The step-down DC/DC converter 900 transitions to a PWM mode when a bottom level of the coil current $I_L$ becomes positive at time t1.

The present inventors have examined the switching between the PWM mode and the PFM mode and came to recognize the following problems.

Firstly, the average level (bias point) of the output voltage $V_{OUT}$ in the PWM mode is not equal to the average level of the output voltage $V_{OUT}$ in the PFM mode. Therefore, overshoot and undershoot are likely to occur in the switching between the PWM mode and the PFM mode. Large overshoot and undershoot are unfavorable because they can cause malfunction of the load circuit.

Secondly, a load current $I_{OUT1}$ in the transition from the PWM mode of FIG. 3A to the PFM mode is not equal to a load current $I_{OUT2}$ in the transition from the PFM mode of FIG. 3B to the PWM mode. In other words, a hysteresis exists regarding the load current $I_{OUT}$ in transition between the PFM mode and the PWM mode and there is a problem in that there is a decrease in efficiency of the DC/DC converter 900 in a hysteresis region.

Thirdly, if there is a steep fluctuation in the load current $I_{OUT}$ with the mode switching, the DC/DC converter 900 cannot follow the load fluctuation by a delay due to the mode switching, which may be a factor in causing fluctuation in the output voltage $V_{OUT}$.

These problems may occur not only in the step-down DC/DC converter but also in switching power supplies having different topologies, such as a step-up DC/DC converter, a step-up/step-down DC/DC converter, a forward converter, a flyback converter and so on. In addition, these problems must not be considered as problems generally recognized in the art but as originally recognized by the present inventors.

SUMMARY

The present disclosure provides some embodiments of a hysteresis control DC/DC converter which is capable of continuously changing control for light load and control for heavy load, and a control circuit thereof.

According to one embodiment of the present disclosure, there is provided a control circuit of a DC/DC converter. The control circuit includes: a pulse modulator configured to generate a comparison pulse which is transitioned to an on level when a feedback voltage depending on an output voltage of the DC/DC converter is lowered to a lower threshold voltage, and, thereafter, is transitioned to an off level; a peak current detector configured to generate a peak current detection signal asserted when a coil current flowing into a coil of the DC/DC converter reaches a predetermined peak current; a logic unit configured to generate a control pulse which is transitioned to an on level when the comparison pulse is transitioned to the on level, and is transitioned to an off level at a time which is later among the time when the comparison pulse is transitioned to the off level and the time when the peak current detection signal is asserted; and a driver configured to switch a switching transistor of the DC/DC converter based on the control pulse.

With this configuration, in a state where an output current of the DC/DC converter is somewhat large, since the peak current detection signal is asserted before the comparison pulse is transitioned to the off level, the switching can be controlled based on only the comparison pulse. As the output current gets smaller, the peak current detection signal is asserted after the comparison pulse is transitioned to the off level, and the switching transistor is turned off when the coil current reaches the peak current. That is, as the output current decreases, the ON time of the switching transistor is extended and the switching frequency is lowered. This makes it possible to continuously change control in the heavy load and light load states.

The DC/DC converter may be of a synchronous rectification type including the switching transistor and a synchronous rectification transistor. The control circuit may further include an inverted current detector configured to generate an inverted current detection signal asserted when inversion of the coil current flowing into the coil is detected. The logic unit may turn off both the switching transistor and the synchronous rectification transistor when the inverted current detection signal is asserted. With this configuration, it is possible to perform continuous switching between a continuous current mode and a discontinuous current mode in the light load state.

The pulse modulator may include a hysteresis comparator configured to receive the feedback voltage in a first input terminal, receive a reference voltage in a second input terminal and generate a comparison pulse which is transitioned to an off level when the feedback voltage reaches an upper threshold voltage depending on the reference voltage and is transitioned to an on level when the feedback voltage reaches the lower threshold voltage depending on the reference voltage.

The hysteresis comparator may have a variable delay time. The control circuit may further include a frequency controller configured to feedback-control the delay time of the hysteresis comparator so that a frequency of the control pulse approaches a predetermined value. With this configuration, it is possible to stabilize the frequency (cycle) of the comparison pulse in the heavy load state.

The frequency controller may include: a frequency divider configured to divide at least one of the frequencies of the control pulse and a reference clock and make these frequencies equal to each other; a phase comparator configured to generate an error pulse in response to a phase difference or frequency difference between the control pulse and the reference clock which passed through the frequency divider; a charge pump circuit configured to convert the error pulse to an error voltage; and a loop filter configured to filter the error voltage and control the delay time of the hysteresis comparator.

The control circuit may further include a ripple injection circuit configured to superimpose a ripple voltage, based on the control pulse, on one of two inputs of the hysteresis comparator. The ripple injection circuit may include a switch which is turned off when the inverted current detection signal is asserted.

The control circuit may further include an error amplifier configured to generate a reference voltage by amplifying an error between the output voltage and a target voltage. With this configuration, it is possible to improve load regulation and line regulation.

The reference voltage may be a predetermined voltage.

The pulse modulator may include a bottom detection comparator configured to compare the feedback voltage with the lower threshold voltage and generate a bottom detection signal asserted when the feedback voltage falls to the lower threshold voltage, and the comparison pulse may have an on level when the bottom detection signal is asserted and thereafter have an off level after a predetermined ON time elapses.

The bottom detection comparator may have a variable delay time. The control circuit may further include a frequency controller configured to feedback-control the delay time of the bottom detection comparator so that a frequency of the control pulse approaches a predetermined value.

The frequency controller may include: a frequency divider configured to divide at least one of the frequencies of the control pulse and a reference clock and make these frequencies equal to each other; a phase comparator configured to generate an error pulse in response to a phase difference or frequency difference between the control pulse and the reference clock which passed through the frequency divider; a charge pump circuit configured to convert the error pulse to an error voltage; and a loop filter configured to filter the error voltage and control the delay time of the bottom detection comparator.

The control circuit may further include a ripple injection circuit configured to superimpose a ripple voltage, based on the control pulse, on one of two inputs of the bottom detection comparator.

The control circuit may further include an error amplifier configured to generate the lower threshold voltage by amplifying an error between the output voltage and a target voltage. With this configuration, it is possible to improve load regulation and line regulation.

The lower threshold voltage may be a predetermined voltage.

The control circuit may be integrated on a single semiconductor substrate. As used herein, the term "integrated" is intended to include both a case where all elements of a circuit are formed on a semiconductor substrate and a case where main elements of the circuit are integrated on the semiconductor substrate. In addition, some resistors, capacitors and the like for adjustment of a circuit constant may be provided outside the semiconductor substrate. By integrating the circuit as a single IC (Integrated Circuit), it is possible to reduce a circuit area and maintain characteristics of circuit elements uniformly.

According to another embodiment of the present disclosure, there is provided a DC/DC converter including: an output circuit including at least an inductor or a transformer, a switching transistor, a rectification element and an output capacitor; and the above-described control circuit.

According to another embodiment of the present disclosure, there is provided an electronic apparatus including the above-described DC/DC converter.

Any combinations of the above-described elements or changes of the representations of the present disclosure between methods, apparatuses and systems are effective as embodiments of the present disclosure.

BRIEF DESCRIPTION OF THE DRAWINGS

FIGS. 3A and 3B are waveform diagrams of a coil current $I_L$ in switching from a PWM mode to a PFM mode and switching from the PFM mode to the PWM mode, respectively.

FIG. 6 is an operation waveform diagram of the step-down DC/DC converter when a load current $I_{OUT}$ is swept in a decreasing manner.

DETAILED DESCRIPTION

Figure 1A:
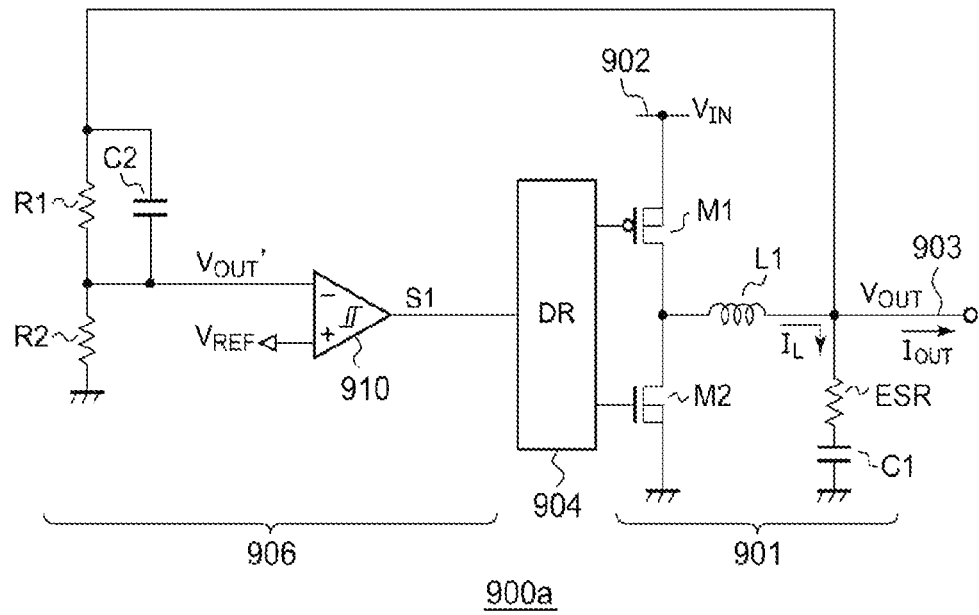
FIGS. 1A and 1B are a circuit diagram showing a step-down DC/DC converter employing a hysteresis control system.

Embodiments of the present disclosure will now be described in detail with reference to the drawings. Throughout the drawings, the same or similar elements, members and processes are denoted by the same reference numerals and explanation of which will not be repeated. The disclosed embodiments are provided for the purpose of illustration, not limitation, of the present disclosure and all features and combinations thereof described in the embodiments cannot be necessarily construed to describe the spirit of the present disclosure.

In the specification, the phrase "connection of member A and member B" is intended to include a direct physical connection of member A and member B as well as an indirect connection thereof via another member as long as the other member has no substantial effect on the electrical connection of member A and member B. Similarly, the phrase "interposition of member C between member A and member B" is intended to include a direct connection of member A and member C or a direct connection of member B and member C as well as an indirect connection thereof via another member as long as the other member has no substantial effect on the electrical connection of member A, member B and member C.

Figure 4:
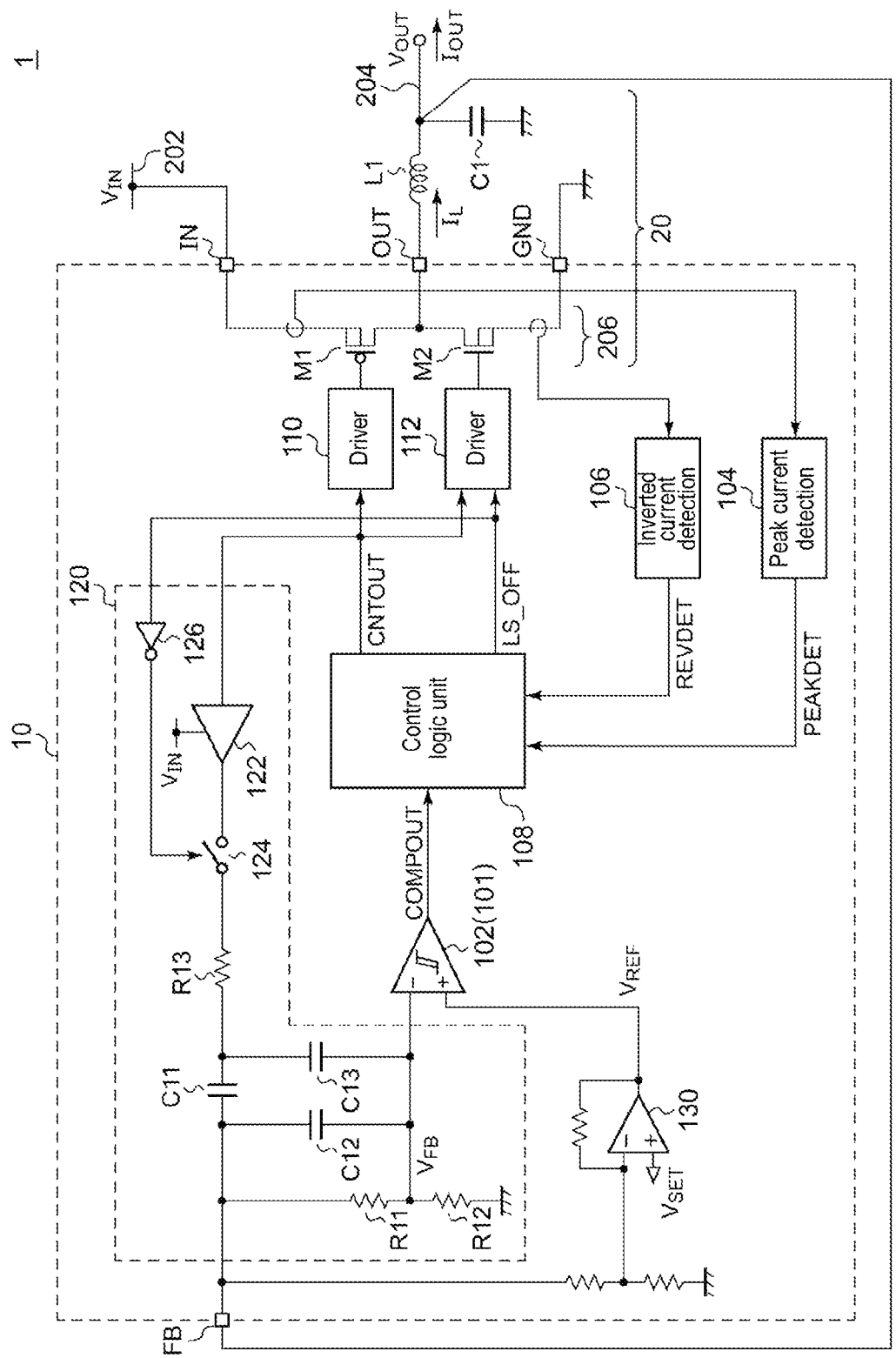
FIG. 4 is a circuit diagram of a step-down DC/DC converter.

FIG. 4 is a circuit diagram of a step-down DC/DC converter 1 (hereinafter simply referred to as a "DC/DC converter") according to an embodiment. The DC/DC converter 1 steps down an input voltage $V_{IN}$ of an input line 202 to generate an output voltage $V_{OUT}$ stabilized to a predetermined level, which is then supplied to a load connected to an output line 204.

The DC/DC converter 1 includes a control circuit 10 and an output circuit 20. The output circuit 20 includes the input line 202, the output line 204, a switching transistor M1, a synchronous rectification transistor M2, an inductor L1 and an output capacitor C1. The output circuit 20 has the same topology as those of typical step-down DC/DC converters and, therefore, explanation of which is omitted.

An input (IN) terminal of the control circuit 10 is connected to the input line 202 and is supplied with an input voltage $V_{IN}$. An output (OUT) terminal is connected to one end of the inductor L1. A ground (GND) terminal is grounded. An output voltage $V_{OUT}$ is fed back to a FB terminal. The control circuit 10 controls switching of the switching transistor M1 and the synchronous rectification transistor M2 such that the fed-back output voltage $V_{OUT}$ approaches a target level.

The control circuit 10 is a controller for a so-called bottom detection hysteresis control and a functional IC including a pulse modulator 101, a peak current detection circuit 104, an inverted current detector 106, a control logic unit 108, a high side driver 110, a low side driver 112, a ripple injection circuit 120, an error amplifier 130 and a switching circuit 206, which are integrated on a single semiconductor substrate.

The switching circuit 206 includes the switching transistor M1 and the synchronous rectification transistor M2, and is a part of the output circuit 20. The switching transistor M1 and the synchronous rectification transistor M2 are connected in series between the IN terminal and the GND terminal. The switching transistor M1 and the synchronous rectification transistor M2 may be discrete components externally attached to the control circuit 10.

The pulse modulator 101 includes a hysteresis comparator 102. The hysteresis comparator 102 has a first input terminal (−) which receives a feedback voltage $V_{FB}$ depending on the output voltage $V_{OUT}$ of the DC/DC converter 1, and a second input terminal (+) which receives a reference voltage $V_{REF}$. The hysteresis comparator 102 compares the feedback voltage $V_{FB}$ with a threshold value depending on the reference voltage $V_{REF}$ and generates a comparison pulse COMPOUT indicating a result of the comparison. Specifically, the hysteresis comparator 102 transitions the comparison pulse COMPOUT to an off level (for example, a low level) when the feedback voltage $V_{FB}$ reaches an upper threshold value $V_H$ depending on the reference voltage $V_{REF}$ and transitions the comparison pulse COMPOUT to an on level (a high level) when the feedback voltage $V_{FB}$ reaches a lower threshold value $V_L$ depending on the reference voltage $V_{REF}$. The configuration of the hysteresis comparator 102 is not particularly limited but may use techniques well-known in the art.

The peak current detection circuit 104 monitors a coil current $I_L$ flowing into the inductor L1 (coil) and asserts a peak current detection signal PEAKDET (for example, transitions this signal PEAKDET to a high level) when the coil current $I_L$ reaches a predetermined peak current $I_{PEAK}$ in the period during which the switching transistor M1 is turned on.

The configuration of the peak current detection circuit 104 is not particularly limited but may detect the coil current $I_L$, for example based on the voltage drop of the switching transistor M1. The peak current detection circuit 104 may be configured using techniques well-known in the art.

When the load current $I_{OUT}$ is somewhat large, the coil current $I_L$ is flown in a positive direction (direction from the OUT terminal to the load). When the load current $I_{OUT}$ is decreased, the direction of the coil current $I_L$ is reversed. The inverted current detector 106 monitors the coil current $I_L$ in the period during which the switching transistor M1 is turned off and asserts an inverted current detection signal REVDET (for example, transitions this signal REVDET to a high level) when inversion of the coil current $I_L$ is detected.

The control logic unit 108 generates a control pulse CNTOUT based on the comparison pulse COMPOUT and the peak current detection signal PEAKDET. Specifically, when the comparison pulse COMPOUT is transitioned to an off level (low level), the control logic unit 108 transitions the control pulse CNTOUT to an off level (for example, a low level). In addition, the control logic unit 108 transitions the control pulse CNTOUT to an on level at a time which is later among the time when the comparison pulse COMPOUT is transitioned to an on level and the time when the peak current detection signal PEAKDET is asserted.

The high side driver 110 and the low side driver 112 switch the switching transistor M1 and the synchronous rectification transistor M2, respectively, based on the control pulse CNTOUT.

In addition, when the inverted current detection signal REVDET is asserted, the control logic unit 108 asserts a low side off signal LS_OFF (for example, transitions this signal LS_OFF to a high level). When the low side off signal LS_OFF is asserted, the low side driver 112 fixes its output to a low level to turn off the synchronous rectification transistor M2. Thus, both the switching transistor M1 and the synchronous rectification transistor M2 are turned off.

The control circuit 10 employs a ripple injection type hysteresis control system. The ripple injection circuit 120 superimposes a ripple voltage $V_{RIP}$, based on the control pulse CNTOUT, on the feedback voltage $V_{FB}$. The ripple injection circuit 120 includes a buffer 122, a switch 124, an inverter 126, capacitors C11 to C13 and resistors R11 to R13. The resistors R11 and R12 divide a voltage $V_{OUT}$ of the FB terminal to generate a base line (average level) of the feedback voltage $V_{FB}$.

The buffer 122 receives the control pulse CNTOUT and generates a feedback pulse switching between the input voltage $V_{IN}$ and the ground voltage (0V). The resistor R13 and the capacitor C11 constitute a low pass filter to filter the feedback pulse and superimpose the ripple voltage synchronized with the feedback pulse, in other words, the control pulse CNTOUT on the feedback voltage $V_{FB}$.

The switch 124 is provided on a feedback path of the feedback pulse and is turned off when the inverted current detection signal REVDET is asserted. For example, the inverter 126 may invert the low side off signal LS_OFF to control the switch 124.

The error amplifier 130 is provided to improve load regulation and line regulation. The error amplifier 130 amplifies an error between the output voltage $V_{OUT}$ and the set voltage $V_{SET}$ to generate the reference voltage $V_{REF}$.

The configuration of the DC/DC converter 1 and the control circuit 10 has been described above. Subsequently, an operation thereof will be described.

Figure 1B:
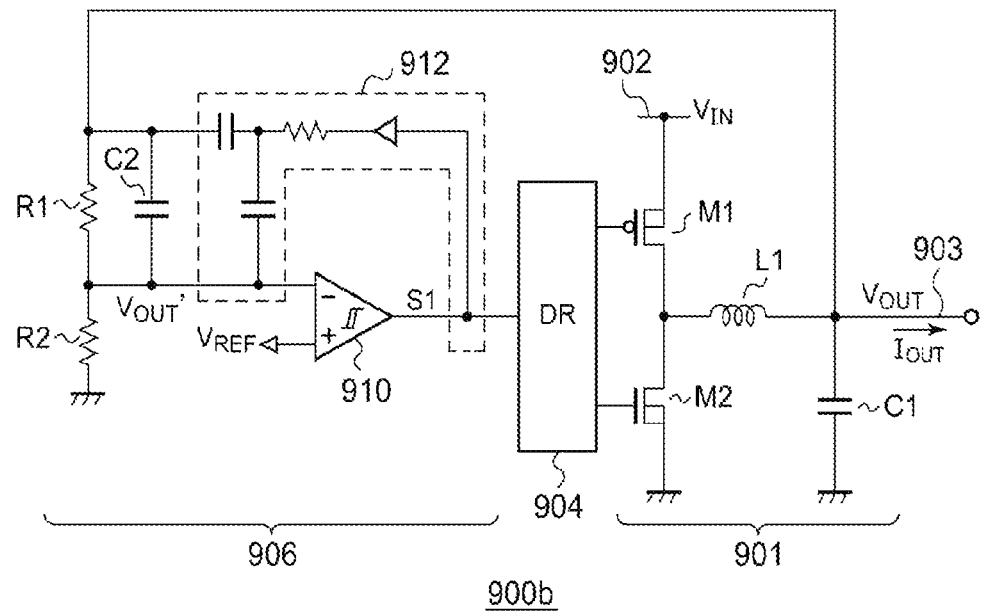
Figure 2:
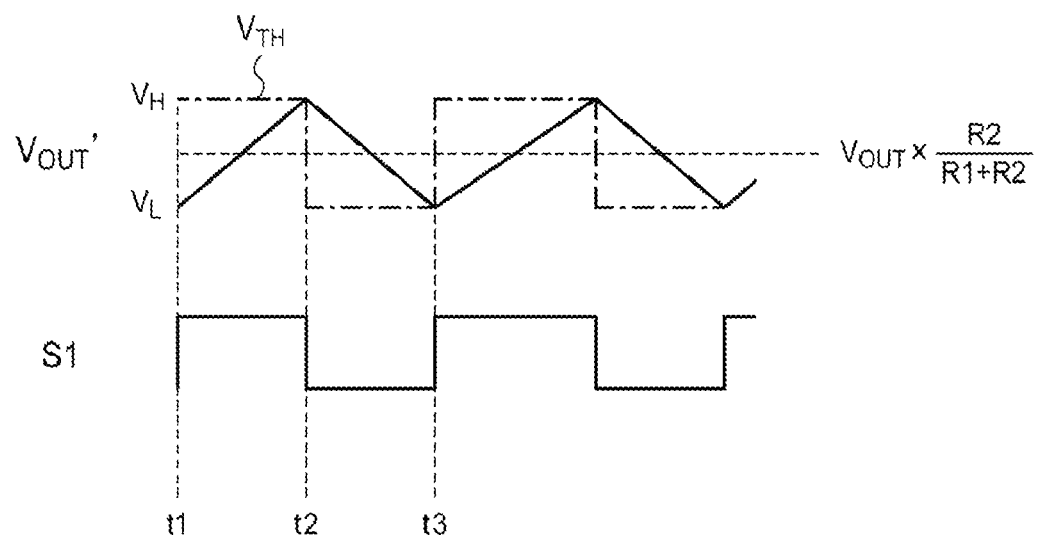
FIG. 2 is an operation waveform diagram of the step-down DC/DC converter shown in FIG. 1A.
Figure 3A:
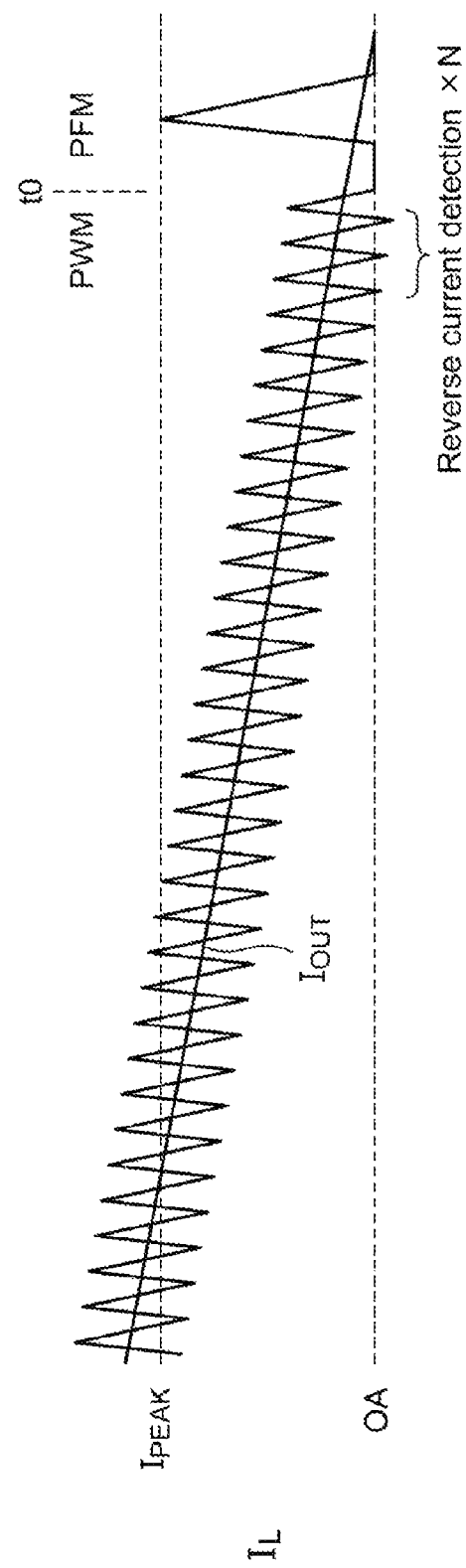
Figure 5A:
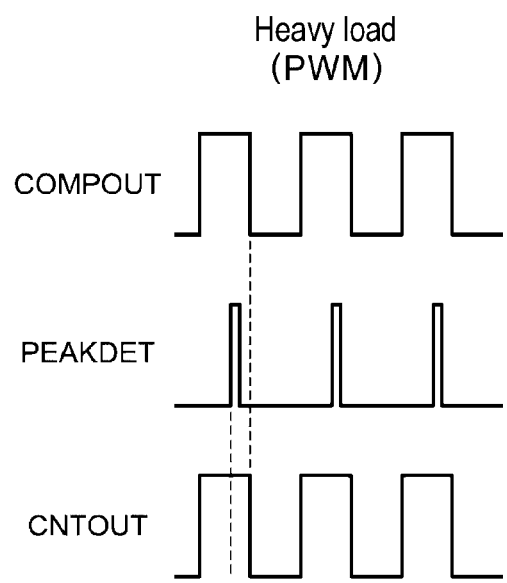
FIGS. 5A and 5B are operation waveform diagrams of the DC/DC converter for heavy load and light load, respectively.
Figure 5B:
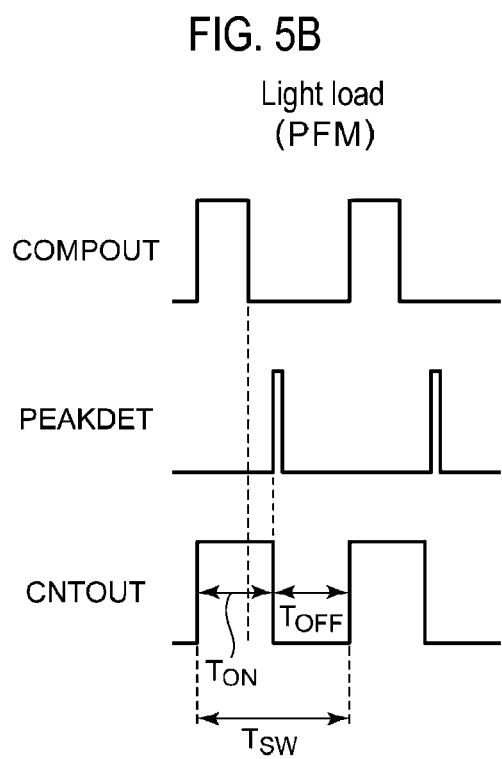

FIGS. 5A and 5B are operation waveform diagrams of the DC/DC converter 1 for heavy load and light load, respectively. As shown in FIG. 5A, in a heavy load state where the load current $I_{OUT}$ is relatively large, the peak current detection signal PEAKDET is asserted before the comparison pulse COMPOUT is transitioned to an off level. Therefore, the peak current detection signal PEAKDET has no effect on the switching operation while the switching is controlled based on only the comparison pulse COMPOUT. This state corresponds to the PWM mode of the DC/DC converter shown in FIG. 1A or 1B.

Subsequently, an operation for light load will be described. When the load current $I_{OUT}$ is decreased, the time at which the peak current detection signal PEAKDET is asserted advances. As shown in FIG. 5B, when the peak current detection signal PEAKDET is asserted after the comparison pulse COMPOUT is transitioned to the off level, the switching is controlled based on the comparison pulse COMPOUT and the peak current detection signal PEAKDET. If the assert time of the peak current detection signal PEAKDET becomes late, the period (ON time) $T_{ON}$ during which the comparison pulse COMPOUT has an on level is extended. If a ratio of the output voltage $V_{OUT}$ to the input voltage $V_{IN}$ is constant in the steady state, a duty cycle $(T_{ON}/(T_{ON}+T_{OFF}))$ of the switching remains constant. Therefore, as the ON time $T_{ON}$ becomes longer, the switching cycle $T_{SW}(=T_{ON}+T_{OFF})$ becomes longer and the switching frequency $f_{SW}$ becomes lower. This state corresponds to the PFM mode of the DC/DC converter shown in FIG. 1A or 1B.

FIG. 6 is an operation waveform diagram of the step-down DC/DC converter 1 when the load current $I_{OUT}$ is swept in a decreasing manner. In FIG. 6, when the load current $I_{OUT}$ before time t0 is large, the step-down DC/DC converter 1 operates with the PWM mode of FIG. 5A. With a decrease of the load current $I_{OUT}$, the assert time of the peak current detection signal PEAKDET in each cycle shifts back.

Time t0 is a time at which the assertion of the peak current detection signal PEAKDET coincides with the transition of the comparison pulse COMPOUT to the off level. After time t0 the assert time of the peak current detection signal PEAKDET is delayed, the ON time $T_{ON}$ of the control pulse CNTOUT is extended, and the switching frequency $f_{SW}$ becomes lower.

Before time t1, the coil current $I_L$ is always positive. This is referred to as a continuous current mode (CCM). Furthermore, when the load current $I_{OUT}$ decreases and the bottom of the coil current $I_L$ enters a negative region (at time t1), the inverted current detection signal REVDET is asserted and the step-down DC/DC converter 1 operates with a discontinuous current mode (DCM). In the discontinuous current mode (DCM), when the inverted current detection signal REVDET is asserted, until the comparison pulse COMPOUT is transitioned to the on level, the switching transistor M1 and the synchronous rectification transistor M2 are both turned off and the switching is stopped.

Figure 7:
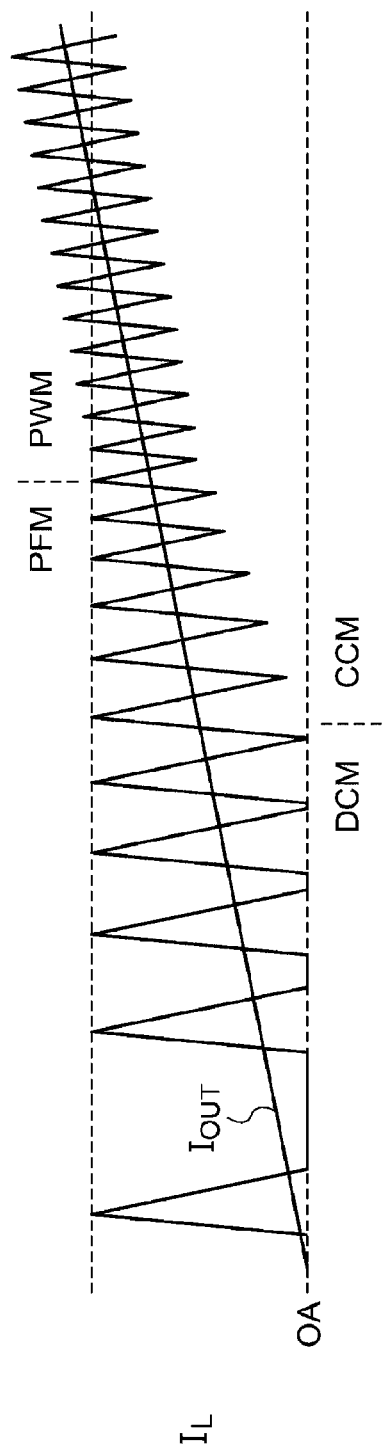
FIG. 7 is an operation waveform diagram of the step-down DC/DC converter when the load current $I_{OUT}$ is swept in an increasing manner.

FIG. 7 is an operation waveform diagram of the step-down DC/DC converter 1 when the load current $I_{OUT}$ is swept in an increasing manner. In a circuit operation when the load current $I_{OUT}$ is increased, the DCM mode is transitioned to the CCM mode and the PFM mode is transitioned to the PWM mode.

The operation of the DC/DC converter 1 has been described above.

With the DC/DC converter 1 according to the embodiment, as the load current $I_{OUT}$ is decreased, the ON time of the switching transistor M1 is extended and the switching frequency $f_{SW}$ becomes lower. This makes it possible to continuously change control in the heavy load state and the light load state.

The DC/DC converter 1 can achieve the following advantages.

Firstly, since the DC/DC converter 1 employs the control system common to the heavy load and the light load, discrepancy of the average level of the output voltage $V_{OUT}$, which became conventionally a problem in the case of switching between the PWM mode and the PFM mode, does not occur. This can prevent overshoot and undershoot in load variations.

Secondly, a problem of a decrease of efficiency of the DC/DC converter 900 in a hysteresis region of the load current $I_{OUT}$ in transition between the PFM mode and the PWM mode can be overcome.

Thirdly, since mode switching is not accompanied, a delay due to the mode switching does not occur, thereby achieving good load responsiveness.

In addition, when the inverted current detection signal REVDET is asserted, the switching transistor M1 and the synchronous rectification transistor M2 are both turned off. This makes it possible to achieve continuous switching between the continuous current mode and the discontinuous current mode in the light load state.

EXAMPLES

Figure 8:
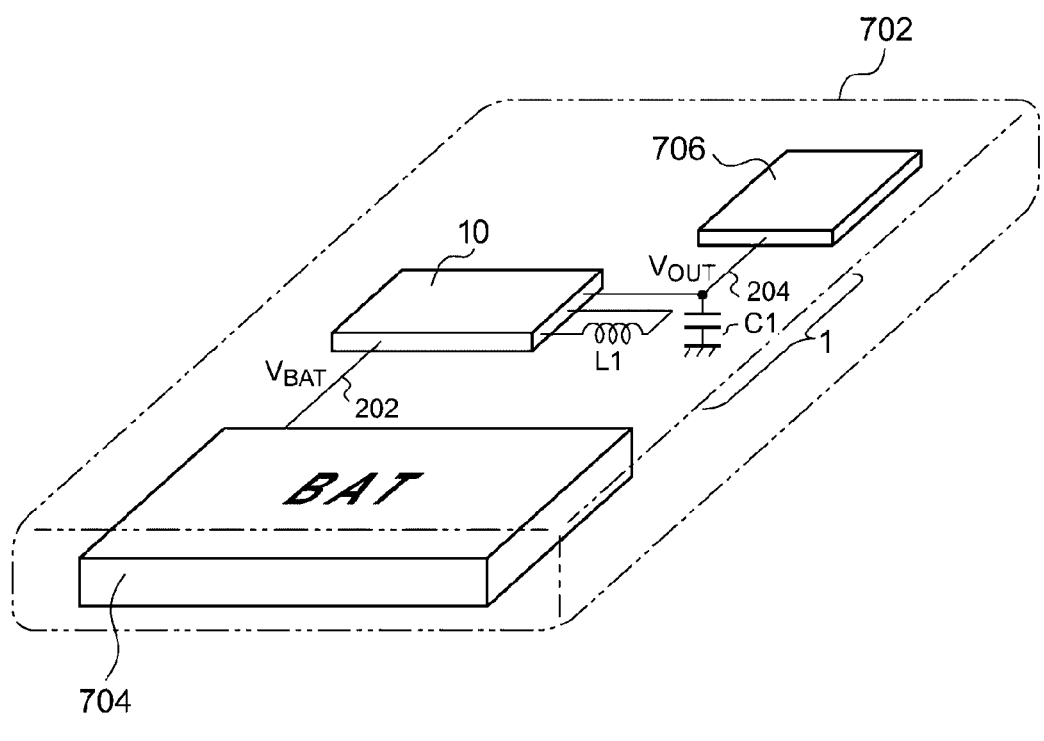
FIG. 8 is a view showing one example of an electronic apparatus including a DC/DC converter according to an embodiment.

Subsequently, applications of the DC/DC converter 1 will be described. FIG. 8 is a view showing one example of an electronic apparatus 700 including the DC/DC converter 1 according to an embodiment. The electronic apparatus 700 is a battery-driven device such as a mobile phone, digital camera, digital video camera, tablet terminal, portable audio player or the like. The electronic apparatus 700 includes a case 702, a battery 704, a microprocessor 706 and a DC/DC converter 1. The DC/DC converter 1 receives a battery voltage $V_{BAT}$ ($=V_{IN}$) at its input line 202 from the battery 704 and supplies an output voltage $V_{OUT}$ to the microprocessor 706 connected to its output line 103.

The present disclosure has been described above by way of embodiments. The disclosed embodiments are only illustrations. It should be understood by those skilled in the art that various modifications to combinations of elements or processes may be made and such modifications fall within the scope of the present disclosure. Such modifications will be described below.

First Modification

Figure 9:
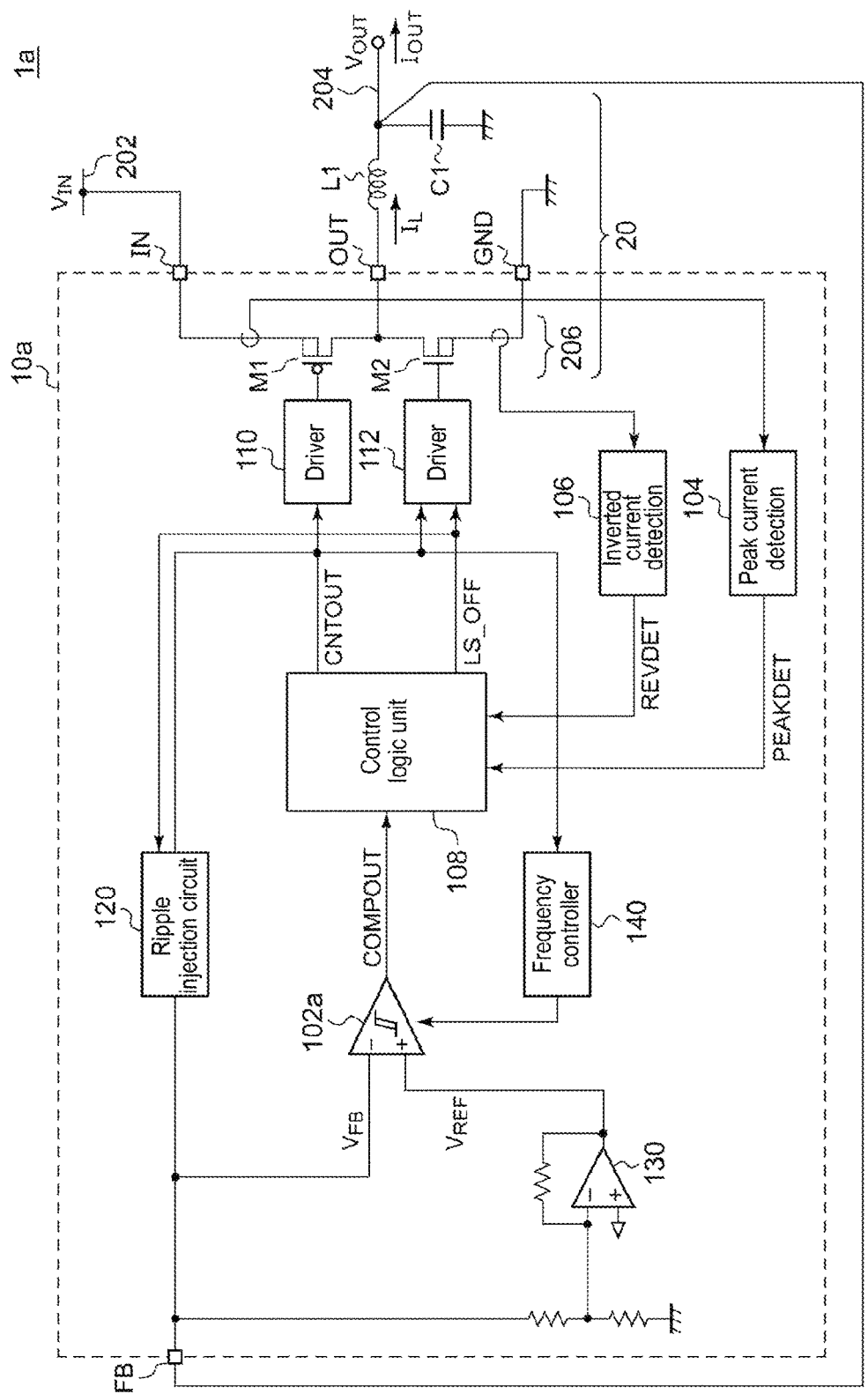
FIG. 9 is a circuit diagram of a DC/DC converter according to a first modification.

FIG. 9 is a circuit diagram of a DC/DC converter 1a according to a first modification. Differences from the DC/DC converter 1 shown in FIG. 4 will be described below.

A control circuit 10a includes a frequency controller 140 in addition to the control circuit 10. A hysteresis comparator 102a has variable delay time. For example, the delay time (response speed) of the hysteresis comparator 102a becomes faster as its bias current is increased and becomes slower as the bias current is decreased. Therefore, the bias current of the hysteresis comparator 102a may be supplied and adjusted by a variable current source.

The frequency controller 140 receives a control pulse CNTOUT or a corresponding pulse signal and feedback-controls the delay time of the hysteresis comparator 102a such that the frequency of the control pulse CNTOUT approaches a predetermined value.

Figure 10:
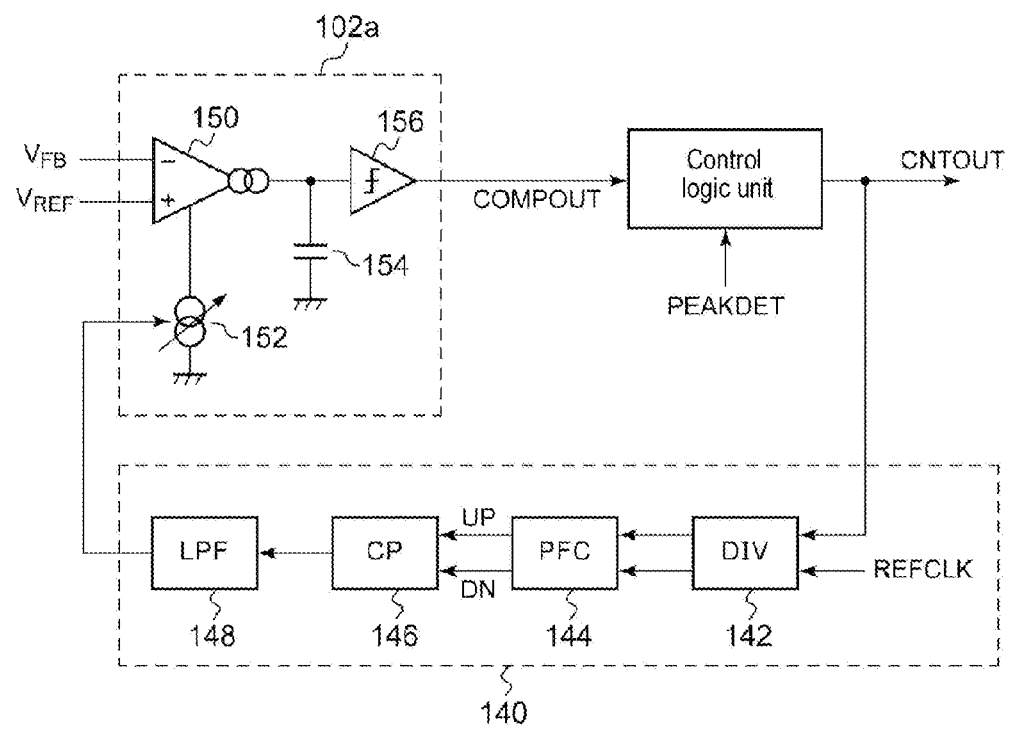
FIG. 10 is a circuit diagram showing a configuration example of a hysteresis comparator and a frequency controller.

FIG. 10 is a circuit diagram showing a configuration example of the hysteresis comparator 102a and the frequency controller 140. The hysteresis comparator 102a includes a differential amplifier 150 whose output current (source current or sink current) can be controlled based on a bias current generated by a bias current source 152. A capacitor 154 is a parasitic capacitance which is charged/discharged by an output current of the differential amplifier 150. An output stage 156 digitizes a voltage of the capacitor 154. When the output current of the differential amplifier 150 is increased, a charging/discharging speed of the capacitor 154 is increased, thereby increasing the response speed of the hysteresis comparator 102a and shortening the delay time thereof. On the contrary, when the output current of the differential amplifier 150 is decreased, the charging/discharging speed of the capacitor 154 is decreased, thereby lengthening the delay time of the hysteresis comparator 102a.

The frequency controller 140 is configured with a so-called PLL (Phase Locked Loop) or FLL (Frequency Locked Loop) circuit. A frequency divider 142 divides at least one of the frequencies of the control pulse CNTOUT and a reference clock CLKREF and makes these frequencies equal to each other.

A phase comparator 144 generates an error pulse (up signal UP/down signal DN) in response to a phase difference between the control pulse CNTOUT and the reference clock REFCLK which passed through the frequency divider 142. The phase comparator 144 may be replaced with a frequency comparator. A charge pump circuit 146 converts the error pulse to an error voltage by charging/discharging the capacitor according to the up signal UP and the down signal DN. A loop filter 148 filters the error voltage and controls the delay time of the hysteresis comparator 102a.

In the heavy load state, the comparison pulse COMPOUT and the control pulse CNTOUT coincides with each other. Therefore, when the delay time of the hysteresis comparator 102a is changed, the frequency of the control pulse CNTOUT is changed. Therefore, by adjusting the delay time of the hysteresis comparator 102a by means of the PLL circuit or FLL circuit such that the frequency of the control pulse CNTOUT is constant, the switching frequency in the heavy load state can remain constant. In the light load state, since a negative edge of the comparison pulse COMPOUT is ignored and the peak detection signal PEAKDET is used, the delay time of the hysteresis comparator 102a has no effect on the switching frequency.

Second Modification

Although the ripple injection type control circuit 10 has been illustrated in the above embodiment, the present disclosure is not limited thereto. If the ESR of the output capacitor C1 is somewhat large, the ripple injection circuit 120 may be omitted.

Third Modification

In the control circuit 10 of FIG. 4, the error amplifier 130 may be omitted and the reference voltage $V_{REF}$ may be fixed at a predetermined voltage.

Fourth Modification

Figure 11:
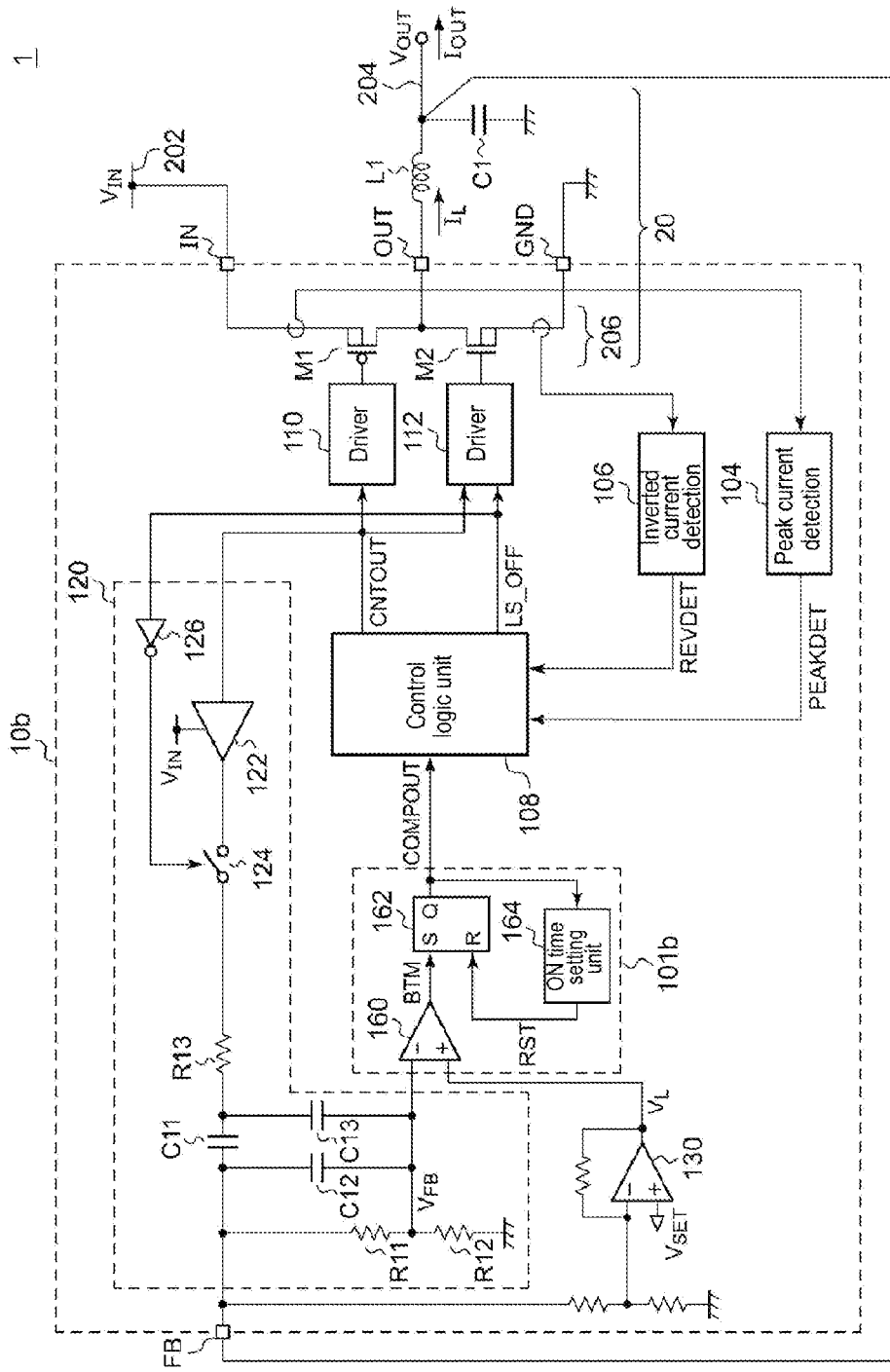
FIG. 11 is a circuit diagram of a step-down DC/DC converter according to a fourth modification.

Although the controller for bottom detection hysteresis control using the hysteresis comparator has been illustrated in the above embodiment, the present disclosure is not limited thereto. FIG. 11 is a circuit diagram of a step-down DC/DC converter 1b according to a fourth modification. The control circuit 10b is a controller for a so-called bottom detection ON time fixed hysteresis control. A pulse modulator 101b is replaced for the hysteresis comparator 102 of FIG. 4 and includes a bottom detection comparator 160, a flip-flop 162 and an ON time setting circuit 164. Other configurations are the same as those in the control circuit 10 of FIG. 4.

In this modification, an output voltage of the error amplifier 130 is a lower threshold voltage $V_L$. The bottom detection comparator 160 compares the feedback voltage $V_{FB}$ with the lower threshold voltage $V_L$ and generates a bottom detection signal BTM asserted (for example, having a high level) when the feedback voltage $V_{FB}$ falls to the lower threshold voltage $V_L$.

The flip-flop 162 is, for example, a RS flip-flop and has a set terminal to which the bottom detection signal BTM is input. When an output of the flip-flop 162 is transitioned to an on level (high level), the ON time setting circuit 164 asserts a reset signal RST (i.e., transitions the reset signal RST to a high level) after a predetermined ON time $T_{ON}$ elapses. The reset signal RST is input to the reset terminal of the flip-flop 162. The ON time setting circuit 164 may be configured with a delay circuit or a one-shot circuit.

The pulse modulator 101b outputs a comparison pulse COMPOUT which has an on level when the bottom detection signal BTM is asserted and thereafter has an off level after the predetermined ON time $T_{ON}$ elapses.

Figure 12:
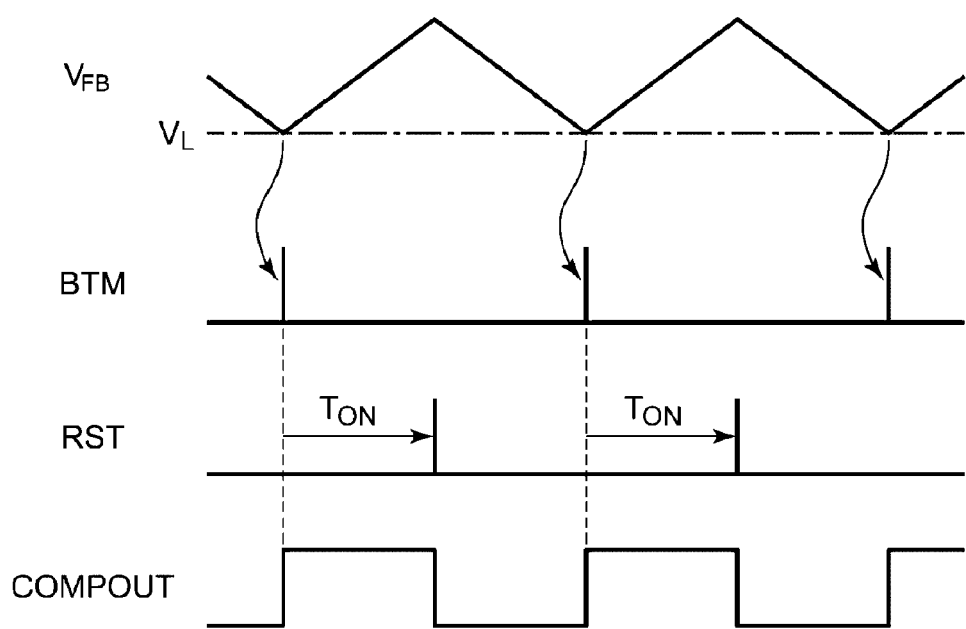
FIG. 12 is an operation waveform diagram of the step-down DC/DC converter shown in FIG. 11.

FIG. 12 is an operation waveform diagram of the step-down DC/DC converter 1b shown in FIG. 11. The step-down DC/DC converter 1b shown in FIG. 11 can achieve the same effects as the above embodiment.

In the control circuit 10b of FIG. 11, the bottom detection comparator 160 may have a variable delay time which is feedback-controlled by the frequency controller 140. In the control circuit 10b of FIG. 11, the error amplifier 130 may be omitted and the lower threshold voltage $V_L$ may be fixed at a predetermined voltage. In addition, in the control circuit 10b of FIG. 11, the ripple injection circuit 120 may be omitted.

Fifth Modification

Although the synchronous rectification type DC/DC converter has been described in the above embodiment, the present disclosure can be applied to a diode rectification type DC/DC converter in which the synchronous rectification transistor M2 is replaced with a diode. In this case, the switching between the DCM mode and the CCM mode is omitted.

Sixth Modification

Although the step-down DC/DC converter has been illustrated in the above embodiment, the form of DC/DC converter is not particularly limited. The present disclosure can be applied to a step-up DC/DC converter using an inductor, a step-up/step-down DC/DC converter using an inductor, a forward converter using a transformer, a flyback converter and so on and the topology of the output circuit 20 may be modified in various ways.

According to the present disclosure in some embodiments, it is possible to continuously change control in the heavy load and light load states.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A control circuit of a DC/DC converter, comprising:
a pulse modulator configured to generate a comparison pulse which is transitioned to an on level when a feedback voltage depending on an output voltage of the DC/DC converter is lowered to a lower threshold voltage, and, thereafter, is transitioned to an off level;
a peak current detector configured to generate a peak current detection signal asserted when a coil current flowing into a coil of the DC/DC converter reaches a predetermined peak current;
a logic unit configured to generate a control pulse which is transitioned to an on level when the comparison pulse is transitioned to the on level, and is transitioned to an off level at a time which is later among a time when the comparison pulse is transitioned to the off level and a time when the peak current detection signal is asserted; and
a driver configured to switch a switching transistor of the DC/DC converter based on the control pulse,
an inverted current detector configured to generate an inverted current detection signal asserted when inversion of the coil current flowing into the coil is detected,
wherein the DC/DC converter is of a synchronous rectification type including the switching transistor and a synchronous rectification transistor, and
wherein the logic unit turns off both of the switching transistor and the synchronous rectification transistor when the inverted current detection signal is asserted.

2. The control circuit of claim 1, wherein the pulse modulator includes a hysteresis comparator configured to receive the feedback voltage in a first input terminal, receive a reference voltage in a second input terminal and generate the comparison pulse which is transitioned to an off level when the feedback voltage reaches an upper threshold voltage depending on the reference voltage and is transitioned to an on level when the feedback voltage reaches the lower threshold voltage depending on the reference voltage.

3. The control circuit of claim 2, wherein the hysteresis comparator has a variable delay time,
the control circuit further comprising a frequency controller configured to feedback-control the variable delay time of the hysteresis comparator so that a frequency of the control pulse approaches a predetermined value.

4. The control circuit of claim 3, wherein the frequency controller includes:

a frequency divider configured to divide at least one frequency of the control pulse and a reference clock into a plurality of equal frequencies;
a phase comparator configured to generate an error pulse in response to a phase difference or frequency difference between the control pulse and the reference clock which passed through the frequency divider;
a charge pump circuit configured to convert the error pulse to an error voltage; and
a loop filter configured to filter the error voltage and control the delay time of the hysteresis comparator.

5. The control circuit of claim 2, further comprising a ripple injection circuit configured to superimpose a ripple voltage, based on the control pulse, on one of two inputs of the hysteresis comparator.

6. The control circuit of claim 2, further comprising:
a ripple injection circuit configured to superimpose a ripple voltage, based on the control pulse, on one of two inputs of the hysteresis comparator,
wherein the ripple injection circuit includes a switch which is turned off when the inverted current detection signal is asserted.

7. The control circuit of claim 2, further comprising an error amplifier configured to generate the reference voltage by amplifying an error between the output voltage and a target voltage.

8. The control circuit of claim 2, wherein the reference voltage is a predetermined voltage.

9. The control circuit of claim 1, wherein the pulse modulator includes a bottom detection comparator configured to compare the feedback voltage with the lower threshold voltage and generate a bottom detection signal asserted when the feedback voltage falls to the lower threshold voltage, and wherein the comparison pulse has an on level when the bottom detection signal is asserted and thereafter has an off level after a predetermined ON time elapses.

10. The control circuit of claim 9, wherein the bottom detection comparator has a variable delay time,
the control circuit further comprising a frequency controller configured to feedback-control the variable delay time of the bottom detection comparator so that the frequency of the control pulse approaches a predetermined value.

11. The control circuit of claim 10, wherein the frequency controller includes:
a frequency divider configured to divide at least one frequency of the control pulse and a reference clock into a plurality of equal frequencies;
a phase comparator configured to generate an error pulse in response to a phase difference or frequency difference between the control pulse and the reference clock which passed through the frequency divider;
a charge pump circuit configured to convert the error pulse to an error voltage; and
a loop filter configured to filter the error voltage and control the delay time of the bottom detection comparator.

12. The control circuit of claim 9, further comprising a ripple injection circuit configured to superimpose a ripple voltage, based on the control pulse, on one of two inputs of the bottom detection comparator.

13. The control circuit of claim 9, further comprising:
a ripple injection circuit configured to superimpose a ripple voltage, based on the control pulse, on one of two inputs of the bottom detection comparator, wherein the ripple injection circuit includes a switch which is turned off when the inverted current detection signal is asserted.

14. The control circuit of claim 9, further comprising an error amplifier configured to generate the lower threshold voltage by amplifying an error between the output voltage and a target voltage.

15. The control circuit of claim 9, wherein the lower threshold voltage is a predetermined voltage.

16. The control circuit of claim 1, wherein the control circuit is integrated on a single semiconductor substrate.

17. A DC/DC converter comprising:
an output capacitor; and
a control circuit comprising:
   a pulse modulator configured to generate a comparison pulse which is transitioned to an on level when a feedback voltage depending on an output voltage of the DC/DC converter is lowered to a lower threshold voltage, and, thereafter, is transitioned to an off level;
   a peak current detector configured to generate a peak current detection signal asserted when a coil current flowing into a coil of the DC/DC converter reaches a predetermined peak current;
   a logic unit configured to generate a control pulse which is transitioned to an on level when the comparison pulse is transitioned to the on level, and is transitioned to an off level at a time which is later among a time when the comparison pulse is transitioned to the off level and a time when the peak current detection signal is asserted; and
   a driver configured to switch a switching transistor of the DC/DC converter based on the control pulse,
   an inverted current detector configured to generate an inverted current detection signal asserted when inversion of the coil current flowing into the coil is detected,
   wherein the DC/DC converter is of a synchronous rectification type including the switching transistor and a synchronous rectification transistor, and
   wherein the logic unit turns off both of the switching transistor and the synchronous rectification transistor when the inverted current detection signal is asserted.

18. An electronic apparatus comprising the DC/DC converter of claim 17.

19. A control method of a DC/DC converter, comprising:
generating a comparison pulse which is transitioned to an on level when a feedback voltage depending on an output voltage of the DC/DC converter is lowered to a lower threshold voltage, and, thereafter, is transitioned to an off level;
generating a peak current detection signal asserted when a coil current flowing into a coil of the DC/DC converter reaches a predetermined peak current;
transitioning a control pulse to an on level when the comparison pulse is transitioned to the on level;
transitioning the control pulse to an off level at a time which is later among a time when the comparison pulse is transitioned to the off level and a time when the peak current detection signal is asserted; and
switching a switching transistor of the DC/DC converter based on the control pulse,
wherein the DC/DC converter is of a synchronous rectification type including the switching transistor and a synchronous rectification transistor,
the control method further comprising:
generating an inverted current detection signal asserted when inversion of the coil current flowing into the coil is detected; and
turning off both of the switching transistor and the synchronous rectification transistor when the inverted current detection signal is asserted.

20. The control method of claim 19, wherein the act of generating a comparison pulse includes:
by a hysteresis comparator, generating a comparison pulse which is transitioned to an off level when the feedback voltage reaches an upper threshold voltage depending on a reference voltage and is transitioned to an on level when the feedback voltage reaches the lower threshold voltage depending on the reference voltage.

21. The control method of claim 20, wherein the hysteresis comparator has variable delay time,
the control method further comprising feedback-controlling the delay time of the hysteresis comparator so that a frequency of the control pulse approaches a predetermined value.

22. The control method of claim 19, wherein the act of generating a comparison pulse includes:
by a comparator, comparing the feedback voltage with the lower threshold voltage and generating a bottom detection signal asserted when the feedback voltage falls to the lower threshold voltage; and
transitioning the comparison pulse to an on level when the bottom detection signal is asserted and thereafter transitioning the comparison pulse to an off level after a predetermined ON time elapses.

23. The control method of claim 22, wherein the comparator has variable delay time,
the control method further comprising feedback-controlling the delay time of the comparator so that a frequency of the control pulse approaches a predetermined value.

* * * * *